Dec. 18, 1934.   G. MOULIN ET AL   1,984,420
CAMERA
Filed March 21, 1932   3 Sheets-Sheet 1

INVENTORS
GABRIEL MOULIN
FRED A. LATHE

By Robert M. McManigal
THEIR ATTORNEY.

Dec. 18, 1934.　　G. MOULIN ET AL　　1,984,420
CAMERA
Filed March 21, 1932　　3 Sheets-Sheet 2

INVENTORS
GABRIEL MOULIN
FRED A. LATHE
By Robert M. McManigal
THEIR ATTORNEY

Dec. 18, 1934.   G. MOULIN ET AL   1,984,420
CAMERA
Filed March 21, 1932   3 Sheets-Sheet 3
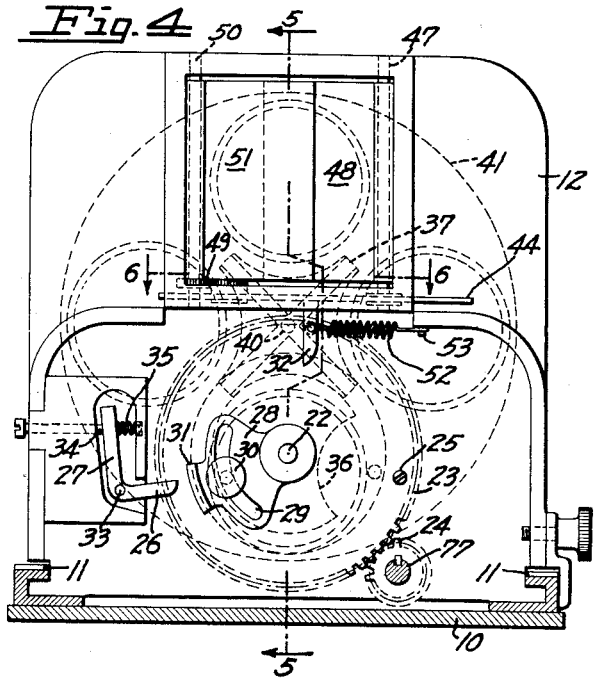
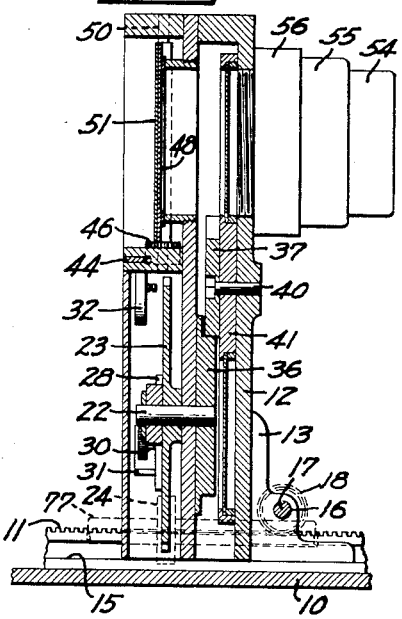
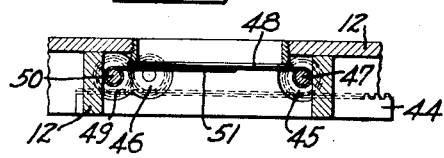
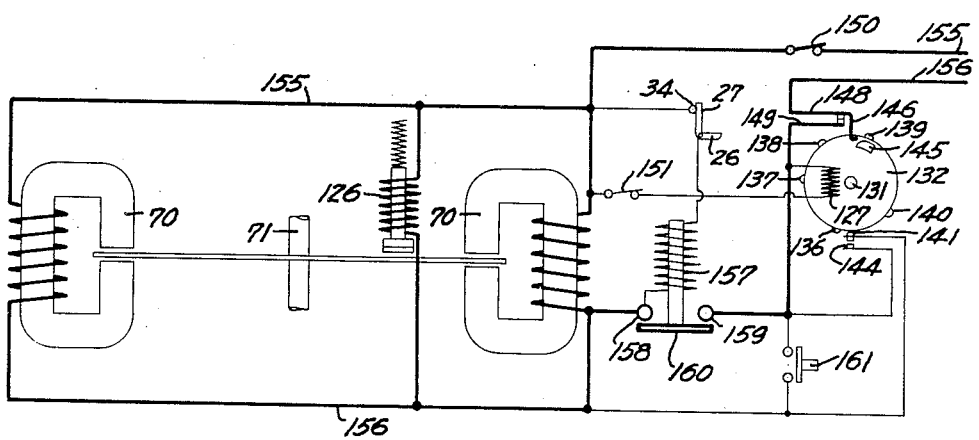
INVENTORS
GABRIEL MOULIN
FRED A. LATHE
BY Robert W. McManigal
THEIR ATTORNEY Patented Dec. 18, 1934

1,984,420

UNITED STATES PATENT OFFICE 1,984,420

CAMERA

Gabriel Moulin, San Francisco, and Fred A. Lathe, Oakland, Calif.; said Lathe assignor to said Moulin Application March 21, 1932, Serial No. 600,130

13 Claims. (Cl. 95—2)

Our invention relates to improvements in cameras by which successive exposures may be made expeditiously and quickly, and is particularly adapted to be used in the production of color separation negatives.

At the present time color separation negatives are made by either making the necessary exposures with an ordinary photographic camera which is a rather tedious and slow method, by using a camera provided with a plurality of light reflecting prisms, which prisms are expensive and do not reflect all the light rays perfectly, or by the use of tripacks, which are unsatisfactory for many reasons.

In the production of color separation negatives, the time of exposing the several photographic plates is not the same for each color separation negative, but varies according to the color filter, the sensitivity of the emulsion on the plates, the intensity of the light, the opening of the lens, and several other factors.

It is an object of our invention to provide a camera equipped with an electrically operated timing device which may be set to give the several plates the proper exposures. The exposures of the several plates may be set for varying periods of time in accordance with predetermined calculations or instructions.

It is an object of our invention to provide a camera equipped with an electrically operated timing device to automatically and definitely control the exposure of the photographic plates.

Another object of our invention is to produce a camera equipped with a rotatable turret provided with a plurality of photographic plate holder receiving openings.

Another object of our invention is to provide a camera which is adapted to be used in black and white photography, particularly in portrait work, to produce successive exposures in a minimum of time.

Another object of our invention is to produce a camera provided with an electrically operated automatic device which will prevent the motion of the moving parts when all of the photographic plates have been exposed, thereby preventing double exposures.

Other and further objects of our invention will be evident from the following description of our invention.

Figure 4 is a section taken on the line 4—4 of Figure 2.

Figure 5 is a section taken on the line 5—5 of Figure 4.

Figure 6 is a section taken on the line 6—6 of Figure 4.

Figure 7 is a diagrammatic view showing the electrical connections of the camera.

Figure 8 is a modification of the rotatable turret shown in Figure 2.

Figure 1:
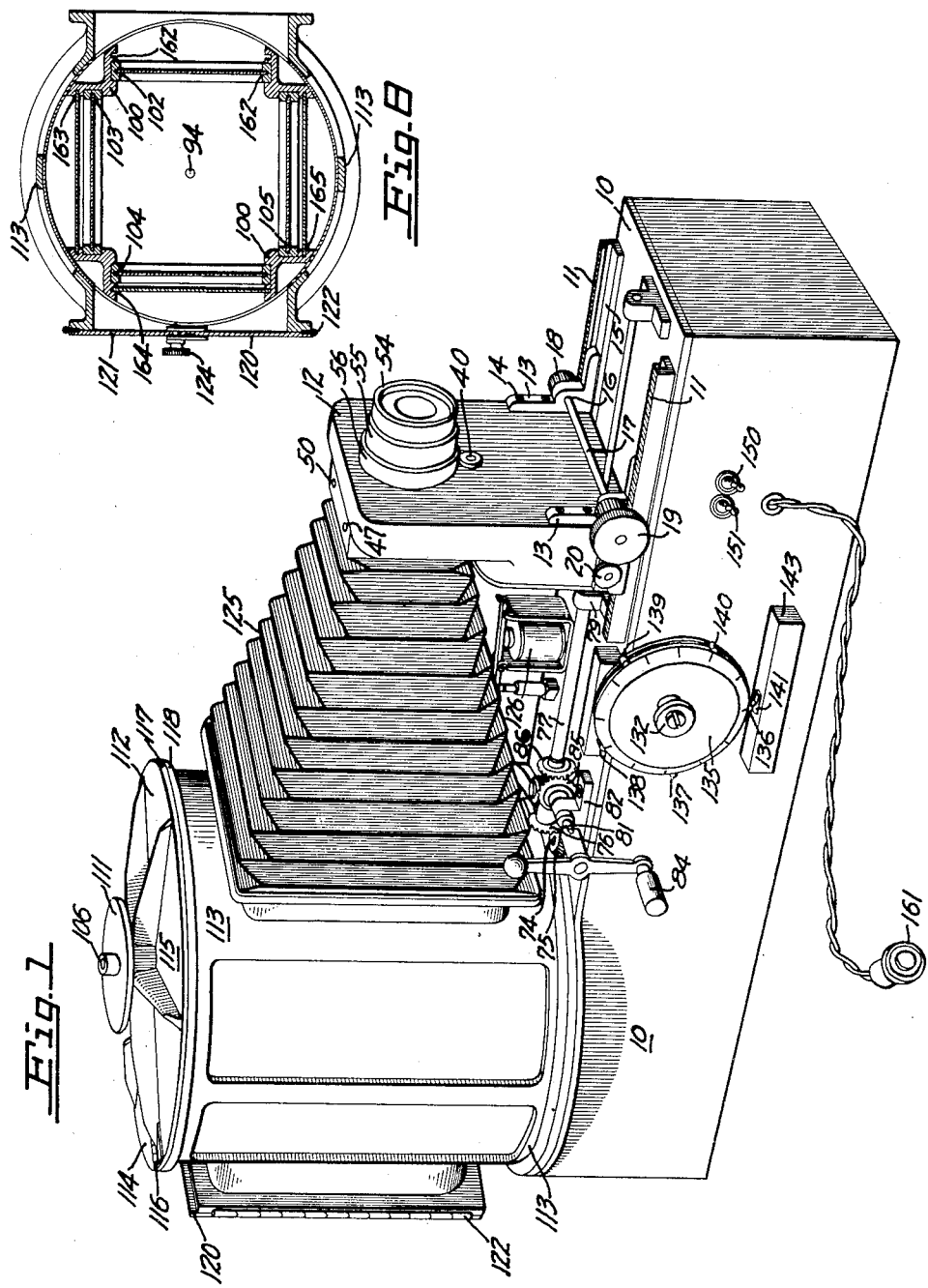
Figure 1 is a perspective view of the camera of our invention.

In the drawings the numeral 10 designates a support upon which is mounted racks 11, a drive shaft 77, a timing dial 135, a contactor housing 143, a solenoid brake 126, an auxiliary drive shaft 81, and a turret housing 113.

Mounted upon the racks 11 is a housing 12. The housing 12 is provided with supports 13 to which it is secured by means of screws 14. The supports 13 are adapted to slide in the smooth runners 15 of racks 11. The supports 13 are provided with openings 16 through which a bar 17 extends. The bar 17 is provided with gears 18 which are adapted to engage the racks 11. The bar 17 is also provided with a thumb-screw 19, by means of which the housing may be moved longitudinally on the racks 11. The housing 12 is also provided with a set-screw 20, by means of which the housing may be set against movement.

The housing 12 is provided with shafts 22 and 40. A gear 23 is mounted upon the shaft 22, which is driven by a gear 24. The gear 24 is mounted upon drive shaft 77. The gear 23 is provided with a lug 25, which is adapted to engage one arm 26 of the contactor 27. A cam 28 is also mounted upon shaft 22. The cam is provided with a slot 29, a thumb-screw 30, and an abutting surface 31, which is adapted to engage a trigger 32.

The time of contact between the abutting surface 31 and the trigger 32 is adapted to be regulated by means of the thumb-screw 30.

The contactor 27 is mounted upon a shaft 33 and contacts the terminal 34. The contactor 27 is held in engagement with the terminal 34 by means of spring 35. When the lug 25 engages arm 26 the arm 26 is depressed, and the contact between contactor 27 and the terminal 34 is broken. The arm 26 is only engaged momentarily by the lug 25 and as soon as the engagement terminates, the spring 35 forces contactor 27 back into engagement with the terminal 34.

A Geneva gear 36 is also mounted upon the shaft 22, which gear rotates Geneva star 37. The Geneva star 37 is non-rotatably mounted upon the shaft 40. A circular wheel 41 provided with four circular openings is also non-rotatably mounted upon the shaft 40. The circular openings are provided with colorless, red, green and blue filters respectively.

The trigger 32 is mounted upon a rack 44. The rack 44 engages gears 45 and 46. The gear 45 is non-rotatably mounted upon a shaft 47. A shutter 48 is non-rotatably mounted upon the shaft 47. The gear 46 is an intermediate gear and engages a gear 49 which is non-rotatably mounted upon a shaft 50. A shutter 51 is non-rotatably mounted upon the shaft 50. The shutters 48 and 51 are adapted to overlap in order to insure a light-tight connection. The position of the shutters 48 and 51 is indicated by the position of the rack 44 which protrudes from the housing 12 when said shutters are closed.

The trigger 32 is connected to one end of a spring 52, the other end of which is connected to a lug 53 in housing 12. The spring 52 is adapted to force the trigger to its normal position as soon as it is released from engagement with the abutting surface 31 of cam 28. As the trigger 32 is moved from left to right by the abutting surface 31, the shutters 48 and 51 are opened. The shutters remain open until the gear 23 rotates to such an extent that the abutting surface 31 no longer engages the trigger 32. The spring 52 then forces the trigger 32 to the right and the shutters 48 and 51 are closed instantly.

The housing 12 is also provided with a lens holder 54 and flanges 55 and 56.

A slow speed induction motor 70 is provided which drives a shaft 71. A gear 72 is mounted upon the shaft 71 and is adapted to engage a gear 73 which is mounted upon a shaft 74. Mounted upon the upper end of shaft 74 is a bevel-gear 75 which is adapted to engage a bevel-gear 76. The bevel-gear 76 is mounted upon one end of the drive shaft 77. The drive shaft 77 is mounted upon support 10 by means of brackets 78 and 79 and screws 80.

An auxiliary shaft 81 is provided so that the drive shaft 77 may be manually operated. The shaft 81 is mounted upon the support 10 by means of bracket 82 and screws 83, and is provided with a handle 84. A bevel-gear 85 is mounted upon one end of the shaft 81 and engages a bevel-gear 86 which is provided for it on drive shaft 77.

A gear 88 is also mounted upon the shaft 71. The gear 88 engages an intermediate gear 89 which is mounted upon a shaft 90. The intermediate gear 89 engages a Geneva gear 91 which is mounted upon a shaft 92. The Geneva gear 91 engages a Geneva star 93 which is non-rotatably mounted upon a shaft 94. The Geneva star is fixed to the rotatable turret 100 by means of screws 101.

The rotatable turret 100 is provided with photographic plate holder receiving openings 102, 103, 104 and 105, and a shaft 106. Photographic plate holder receiving openings 102, 103, 104 and 105 are provided with photographic plate holders 107, 108, 109 and 110 respectively. A dial 111 is non-rotatably mounted upon the shaft 106, which dial indicates the position of the several plate holder receiving openings.

The top 112 of the rotatable housing 113 is made in two parts 114 and 115, which are connected together by a hinge 116, which forms a light-tight connection. In order to facilitate the movement of the plate holders from the plate holder receiving openings 102, 103, 104 and 105, the top 112 of the housing is rotatable on the turret housing proper. Member 117 of top 112 is adapted to rotate on member 118 of housing 113 and forms a light-tight connection in all positions.

Figures 2, 3:
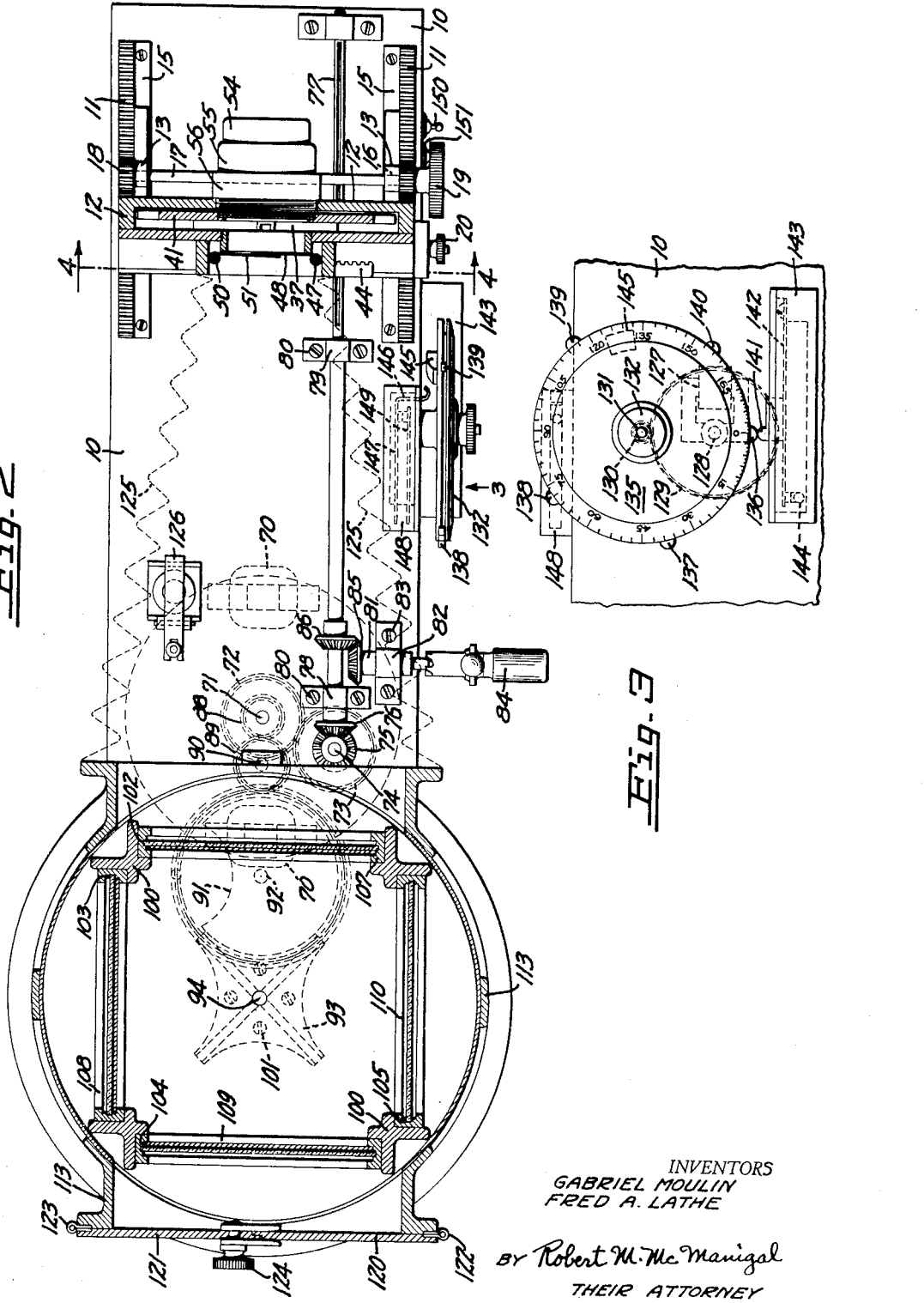
Figure 2 is a plan view of the camera shown in Figure 1, partially sectioned.
Figure 3 is an elevational view of the timing mechanism. The direction in which the view is taken is indicated by the arrow 3 of Figure 2.

The rear of the housing 113 is provided with doors 120 and 121, which are connected to the housing proper by means of hinges 122 and 123 respectively. The doors are also provided with a locking nut 124 which insures a light-tight connection. The other end of the turret housing is connected to bellows 125. The other end of the bellows 125 is connected to that portion of the housing 12 immediately adjacent the shutters 48 and 51 as shown in Figures 1 and 2.

The solenoid brake 126 is provided to stop the rotation of the rotary part of the motor 70 as soon as the circuit is broken.

A "Telechron" motor 127 is provided which drives a shaft 128. The gear 129 is mounted upon the shaft 128. The gear 129 engages a gear 130 which is mounted upon shaft 131. A knob 132 and a timing dial 135 are also mounted upon the shaft 131. The timing dial is conveniently marked and is provided with lugs 136, 137, 138, 139 and 140, which lugs are adapted to engage a contactor 141. The contactor 141 is mounted upon a bar 142 in contactor housing 143. When the bar 142 is depressed it is adapted to engage the contactor 144, which completes the electrical circuit.

The gears 129 and 130 are so constructed that the shaft 131 and the timing dial 135 make one complete revolution every three seconds. The timing dial 135 is divided up into one hundred and eighty equal divisions, so that each division represents a sixtieth of a second.

A cam 145 is mounted upon the rear of the timing dial 135 and is adapted to engage a continuation 146 of a switch arm 147 of a switch 148. The switch 148 consists of arms 147 and 149, and functions as a limit switch, which is adapted to break the electrical circuit as cam 145 engages the continuation 146 of switch arm 147. The cam 145 is mounted on the timing dial 135 in such a manner that the break will occur after all of the desired plates have been exposed, i. e. as the dial nears the completion of a cycle.

A motor toggle switch 150 and a clock toggle switch 151 are also provided which are connected to the induction motor 70 and the "Telechron" clock motor 127, respectively. A push button 161 is also provided for manual operation of the camera.

Numerals 155 and 156 indicate the incoming leads from a suitable source of electric current. It will be seen that the windings of the induction motor 70 are connected to these leads, the toggle switch 150 being interposed in the lead 155 to interrupt the circuit.

The windings of the solenoid brake 126 are shunted across the leads and are in parallel relation with the windings of the induction motor.

A relay 157 is interposed in the lead 156, the windings thereof being also in parallel relation to the windings of the motor, and the brake, and the switch comprising the contacts 27—34 is disposed in series with one lead from the relay coil.

The relay is provided with contacts 158 and 159 and a contactor 160 actuated by a suitable armature connected thereto and actuated by the relay windings. The contacts 141 and 144 of the timing device are disposed in parallel with the contacts 158 and 159 as is a manually operated push button 161. The limit switch 148—149 is disposed in series with the lead 156.

The relay contacts 158 and 159 are normally open when the camera is operating. When the first lug 136 causes contact to be made between the contacts 141—144, energization of the relay windings is effected whereupon the contactor closes the relay circuit and permits current to flow to the motor and brake windings.

As the lug 25 of gear 23 contacts the arm 26, the connection between the contacts 27—34 is broken, whereupon the relay windings, the motor 70, and the solenoid 126, are de-energized, permitting the contactor 160 to drop and open the relay circuit. The solenoid 126 is also de-energized which allows the brake 126 to drop, stopping the moving part of motor 70 in a minimum of time.

Since the timing contacts 141—144, the contacts 158—159, and the push button 161 are all connected in parallel, momentary closing of any of the contacts will close the relay contacts and cause operation of the motor; such operations continuing until the contacts 27—34 are opened, whereupon the mechanism is de-energized until the next timing dial contact is made, or, in manual operation, until the push button is again actuated.

We will describe the operation of our camera as we ordinarily use it, which is in producing three color separation negatives.

The lugs 136, 137, 138 and 139 of the timing dial 135 are set so that the photographic plates 108, 109 and 110 are given the proper exposures. In determining the position of the lugs it should be remembered that an allowance must be made for the interval of time after which the circuit is closed, but during which the shutters 48 and 51 are closed. This is a constant factor and is easily determined by noting the time of contact, and the time when the shutters 48 and 51 are opened. In our camera this interval of time is twenty-eight sixtieths of one second, which corresponds to twenty-eight divisions on the dial 135.

Using A, B, and C filters, an apochromatic lens set at the f. 9 opening, sunlight, and a Wratten and Wainwright panchromatic emulsion, we found that it takes one-sixth of a second, one-tenth of a second and sixteen-sixtieths of a second to produce the red, green and blue color separation negatives respectively. These periods of time correspond to ten, six, and sixteen divisions on the dial 135 respectively. The lug 136 is therefore set at 0, the lug 137 at (28+10) 38, the lug 137 at (38+28+6) 72, and the lug 138 at (72+28+16) 116. Under the above conditions the three color separation negatives are made in less than two seconds.

The camera is then focused on the subject to be photographed. The drive shaft 77 is rotated until the plate holder receiving opening 102 is in a position parallel to the lens and adjacent to the bellows. When the plate holder receiving opening 102 is in this position the colorless filter will be in line with the lens. The plate holders are removed from the turret.

A piece of ground glass contained in a suitable holder is inserted in the plate holder receiving opening 102. A suitable holder for the ground glass may be made by cutting the center out of a standard plate holder and inserting a ground glass in said plate holder. The upper member 114 of turret top 112 is lowered into place, thereby making a light-tight connection. The doors 120 and 121 are opened and the camera is focused on the subject by moving the thumb-screw 19. When the camera is focused the set-screw 20 is tightened. The doors 120 and 121 are closed and locking nut 124 is tightened in order to make a light-tight connection. Standard plate holders are then inserted in plate holder receiving openings 103, 104 and 105, and the slides of the plate holders adjacent to the turret housing are removed so that the plates may be exposed.

Motor toggle switch 150 is turned on. The clock toggle switch 151 is then turned on which completes the circuit, since lug 136 which is set at 0 on the dial 135 is in contact with contactor 141, which in turn depresses bar 142 and causes said bar 142 to contact contactor 144. The motor 70 is thereby started which rotates drive shaft 71 and main drive shaft 77 by means of gears 72, 73, 75 and 76 and shaft 74. The drive shaft 77 rotates gears 23 and 24 and therefore Geneva gear 36. As the gear 23 rotates the abutting surface 31 of cam 28 no longer contacts the trigger 32 and the spring 52 forces the trigger 32 back to its original position, thereby closing the shutters 48 and 51. The abutting surface 31 on the cam 28 is so constructed and adjusted that it is adapted to release the trigger 32 and thereby close the shutters 48 and 51 practically instantaneously after the motor 70 is started.

The rotation of shaft 71 causes the rotation of gears 88 and 89 and of Geneva gear 91. Geneva gear 91 engages Geneva star 92, thereby rotating the rotatable turret one quadrant, and placing the photographic plate holder 108 in a position parallel to the lens.

As the gear 23 continues to rotate the Geneva gear 36 engages Geneva star 37 and rotates the color filter wheel one quadrant, thereby placing the red filter in line with the lens. As the gear 23 continues to rotate the abutting surface 31 of cam 28 engages the trigger 32 and by means of rack 44 and gears 45, 46, and 49, the shutters 48 and 51 are opened. As the gear 23 continues to rotate, the lug 25 engages the arm 26 of the contactor 27 which breaks the circuit, thereby de-energizing the solenoid brake 126 which instantaneously stops the rotation of the moving parts of the motor 70. As previously stated, in our camera the interval of time between the time that the lug 136 contacts contactor 141 and the time that the shutters 48 and 51 are opened is twenty-eight sixtieths of a second.

At this phase of the cycle light is passing through the lens to the photographic plate in standard plate holder 108.

Meanwhile the timing dial 135 is rotating at a constant rate of speed, and when the photographic plate in holder 108 has been exposed the predetermined period of one-sixth of a second, the lug 137 contacts the contactor 141, thereby again completing the circuit, and starting the motor 70. As the gear 23 rotates the trigger 32 is relieved from engagement with the abutting surface 31 of the cam 28, and the spring 52 forces said trigger 32 back to its original position, thereby closing the shutters 48 and 51. As the cycle continues the rotatable turret is rotated a quadrant, thereby placing the photographic plate in plate holder 109 in a position parallel to the lens, the color filter wheel is rotated a quadrant, thereby placing the green filter in line with the lens, the shutters 48 and 51 are opened, and the circuit is again broken as the lug 25 contacts the arm 26 of contactor 27.

When the plate in plate holder 109 has been exposed the predetermined period of one-tenth of a second, the lug 138 contacts the contactor 141, thereby again completing the circuit and starting the motor 70. As the cycle continues the shutters 48 and 51 are closed, the rotatable turret is rotated a quadrant, thereby placing the photographic plate in plate holder 110 in a position to be exposed, the color filter wheel is rotated a quadrant, thereby placing the blue filter in line with the lens, the shutters 48 and 51 are opened, and the circuit is again broken.

The exposure of the plate in plate holder 110 continues until the plate is exposed the predetermined period of sixteen-sixtieths of a second. At the end of that time, the timing dial 135 will have rotated to such an extent that the lug 139 contacts contactor 141, thereby completing the circuit. As the cycle continues, the shutters close, the rotatable turret is rotated a quadrant, thereby placing the plate holder receiving opening 102 in a position parallel to the lens, the color filter wheel is rotated a quadrant, thereby placing the colorless filter in line with the lens, and the circuit is again broken.

As the dial 135 nears the completion of a cycle the cam 145 engages the continuation 146 of the switch arm 147 which raises the arm 147 and thereby breaks the electrical circuit. This prevents the rotation of the moving parts of the camera until the switch arm 147 is moved back to its original position, thereby allowing the electrical circuit to be completed again. This device operates automatically and is adapted to prevent the exposures of plates which have been previously exposed.

The slides which were removed from the plate holders are then replaced, after which the plate holders are removed from the turret. The color separation negatives thus produced may be used to produce color photographs by any number of well known methods.

Our camera is also adapted to produce an extra plate, such as an "autochrome" plate, an ordinary black and white plate, or an additional color separation negative, in addition to the color separation negatives already mentioned. Lugs 136, 137, 138 and 139 are set as before and lug 140 is set depending upon the color filter used, the light, the lens opening, the sensitivity of the emulsion on the photographic plate and the other factors. The colorless filter is replaced by a suitable filter, depending upon the character of the negatives that is desired, and the focusing is done through this filter. After the camera is focused on the object by means of a ground glass, standard plate holders 107, 108, 109 and 110 are placed in plate holder receiving openings 102, 103, 104 and 105 respectively.

The exposure of the photographic plates in plate holders 108, 109, and 110 is the same as previously described. After the plate in plate holder 110 has been exposed the predetermined period of time, the lug 139 contacts contactor 141 thereby completing the circuit. The shutters 48 and 51 close, the rotatable turret is rotated one quadrant, thereby placing the plate in plate holder 107 in position to be exposed, the color filter wheel is rotated a quadrant, thereby placing the suitable color filter in line with the lens, the shutters are opened, and the circuit is broken.

The exposure of the plate in plate holder 107 continues until said plate has been exposed the predetermined period of time. At the end of that time the dial 135 will have rotated to such a degree that the lug 140 engages contactor 141, thereby completing the circuit.

When it is desired to expose as many plates as there are plate holder receiving openings, the cam 145 is set so that it will engage the continuation 146 of switch arm 147 and thereby break the electrical circuit after all of the plates have been exposed, and while the shutters 48 and 51 are closed.

The auxiliary drive shaft 81 is provided so that the camera may be operated manually if desired. The handle 84 is rotated and the motion is imparted to the main shaft 77 by means of gears 85 and 86 and to Geneva star 93 by means of gears 76, 75, 73, 72, 88, 89 and 91. The solenoid brake 126 must be held free from engagement with the motor 70 when the camera is manually operated. The operation of the camera when manually operated will be evident from the foregoing detailed description and will not be given here.

The turret may be constructed with two, three, four, five, six, or any other desired number of plate holder receiving openings.

In a modification of our camera as shown in Figure 8 the rotatable turret is also provided with openings adapted to receive color filter holders. This does away with the necessity of providing a color filter wheel. In addition to the plate holder receiving openings 102, 103, 104 and 105, color filter holder receiving openings 162, 163, 164 and 165 are provided.

The operation of a camera provided with a rotatable turret of this type will be evident from the foregoing detailed description and will not be given here. Obviously the filters in line with the lens are removed while the camera is being focused on the subject to be photographed.

Although we have described our invention with respect to certain particular embodiments thereof, nevertheless we do not desire to be limited to the particular details shown and described except as clearly specified in the appended claims, since many changes, modifications and substitutions may be made without departing from our invention in its broader aspects and our invention in its broader aspects is useful in many other applications thereof.

We claim as our invention:

1. A camera for successively producing color separation negatives which comprises a lens through which light passes to photographic plates; a shutter for controlling the passage of light through said lens; a movable support for a plurality of photographic plates; a movable support for a plurality of color filters; a common motor operatively connected to both of said supports to successively position said plates and color filters to expose each of said plates to the light from said lens through a different color filter; and a timing device for controlling the time of exposure of each plate.

2. A camera for successively producing color separation negatives which comprises a lens; a shutter for controlling the passage of light through said lens; a movable support for a plurality of photographic plates adapted to successively position said plates in the light path through said lens; a movable support for a plurality of color filters adapted to successively interpose said color filters in said light path; a motor; means driven by said motor to alternately move and hold said supports stationary; means actuated by said motor for opening and closing said shutter when said supports are held stationary; means for stopping said motor when said shutter is open; and a timing device for restarting said motor after each opening of the shutter to selectively predetermine the time of exposure of each plate.

3. A camera for successively producing color separation negatives which comprises a lens; a shutter for controlling the passage of light through said lens; a movable support for a plurality of photographic plates adapted to successively position said plates in the light path through said lens; a movable support for a plurality of color filters adapted to successively interpose said color filters in said light path; a motor; means driven by said motor to alternately move and hold said supports stationary; means actuated by said motor for opening and closing said shutter when said supports are held stationary; means for stopping said motor when said shutter is open; a timing device for restarting said motor after each opening of the shutter to selectively predetermine the time of exposure of each plate; and means for stopping the camera when the desired number of plates have been exposed.

4. A camera for successively producing color separation negatives which comprises a lens; a shutter for controlling the passage of light through said lens; a movable support for a plurality of photographic plates adapted to successively position said plates in the light path through said lens; a movable support for a plurality of color filters adapted to successively interpose said color filters in said light path; a motor; an intermittent mechanism driven by said motor for alternately moving and holding stationary the support for said photographic plates; an intermittent mechanism driven by said motor for alternately moving and holding stationary the support for said color filters; means actuated by said motor for opening and closing said shutter when both said supports are stationary; means for stopping said motor when said shutter is open; and a timing device for restarting said motor after each opening of the shutter to selectively predetermine the time of exposure of each plate.

5. A camera for successively producing color separation negatives which comprises a lens; a shutter for controlling the passage of light through said lens; a movable support for a plurality of photographic plates adapted to successively position said plates in the light path through said lens; a movable support for a plurality of color filters adapted to successively interpose said color filters in said light path; an electric motor; a power circuit therefor; means driven by said motor to alternately move and hold said supports stationary; means actuated by said motor for opening and closing said shutter when said supports are held stationary; means for opening said power circuit to stop said motor when said shutter is open, a second electric motor; and a timing device driven thereby for closing said power circuit after each opening of said shutter to restart said first mentioned motor.

6. A camera for successively producing color separation negatives which comprises a lens; a shutter for controlling the passage of light through said lens; a movable support for a plurality of photographic plates adapted to successively position said plates in the light path through said lens; a movable support for a plurality of color filters adapted to successively interpose said color filters in said light path; an electric motor; a power circuit therefor; means driven by said motor to alternately move and hold said supports stationary; means actuated by said motor for opening and closing said shutter when said supports are held stationary; means for opening said power circuit to stop said motor when said shutter is open, a second electric motor; and a timing device driven thereby for closing said power circuit after each opening of said shutter to restart said first mentioned motor, said timing device having adjustable means to stop both motors when the desired number of plates have been exposed.

7. A camera for successively producing color separation negatives which comprises: a lens through which light passes to photographic plates; a plurality of color filters adapted to be selectively interposed in the light path; a rotatable turret having diametrically opposed apertures opening into the interior thereof to receive and retain photographic plates; a turret housing surrounding said turret, said housing having an opening at the side thereof communicating with said lens and a second opening at the opposite side thereof to provide for focusing said camera; a light tight closure for said second opening; and means to intermittently rotate said turret and successively interpose said color filters in said light path.

8. A camera for successively producing color separation negatives which comprises a lens through which light passes to photographic plates; a shutter for controlling the passage of light through said lens; a movable support for a plurality of photographic plates and a plurality of color filters; a motor operatively connected to said support to successively position said plates and color filters to expose each of said plates to the light from said lens through a different color filter; and a timing device for controlling the time of exposure of each plate.

9. A camera for successively producing color separation negatives which comprises a lens; a shutter for controlling the passage of light through said lens; a movable support for a plurality of photographic plates adapted to successively position said plates in the light path through said lens and for a plurality of color filters adapted to successively interpose said color filters in said light path; a motor; means driven by said motor to alternately move and hold said support stationary; means actuated by said motor for opening and closing said shutter when said support is held stationary; means for stopping said motor when said shutter is open; and a timing device for restarting said motor after each opening of the shutter to selectively predetermine the time of exposure of each plate.

10. A camera for successively producing color separation negatives which comprises a lens; a shutter for controlling the passage of light through said lens; a movable support for a plurality of photographic plates adapted to successively position said plates in the light path through said lens and for a plurality of color filters adapted to succesively interpose said color filters in said light path; a motor, means driven by said motor to alternately move and hold said support stationary; means actuated by said motor for opening and closing said shutter when said support is held stationary; means for stopping said motor when said shutter is open; a timing device for restarting said motor after each opening of the shutter to selectively predetermine the time of exposure of each plate; and means for stopping the camera when the desired number of plates have been exposed.

11. A camera for successively producing color separation negatives which comprises a lens; a shutter for controlling the passage of light through said lens; a movable support for a plurality of photographic plates adapted to succesively position said plates in the light path through said lens and for a plurality of color filters adapted to succesively interpose said color filters in said light path; an electric motor; a power circuit therefor; means driven by said motor to alternately move and hold said support stationary; means actuated by said motor for opening and closing said shutter when said support is held stationary; means for opening said power circuit to stop said motor when said shutter is open, a second electric motor; and a timing device driven thereby for closing said power circuit after each opening of said shutter to restart said first mentioned motor.

12. A camera for successively producing color separation negatives which comprises a lens; a shutter for controlling the passage of light through said lens; a movable support for a plurality of photographic plates adapted to succesively position said plates in the light path through said lens and for a plurality of color filters adapted to successively interpose said color filters in said light path; an electric motor; a power circuit therefor; means driven by said motor to alternately move and hold said support stationary; means actuated by said motor for opening and closing said shutter when said support is held stationary; means for opening said power circuit to stop said motor when said shutter is open, a second electric motor; and a timing device driven thereby for closing said power circuit after each opening of said shutter to restart said first mentioned motor, said timing device having adjustable means to stop both motors when the desired number of plates have been exposed.

13. A camera for successively producing color separation negatives which comprises a lens through which light passes to photographic plates; a rotatable turret having diametrically opposed apertures opening into the interior thereof to receive and retain photographic plates, and means for receiving color filters; a turret housing surrounding said turret, said housing having an opening at the side thereof communicating with said lens and a second opening at the opposite side thereof to provide for focusing said camera; a light tight closure for said second opening; and means to intermittently rotate said turret.

GABRIEL MOULIN.
FRED A. LATHE.